United States Patent [19]

Otsuki et al.

[11] Patent Number: 4,961,802

[45] Date of Patent: Oct. 9, 1990

[54] METHOD OF MANUFACTURING A LENS ARRAY FOR READING INFORMATION

[75] Inventors: Toshinori Otsuki, Yawata; Takuji Nakamura, Hirakata, both of Japan

[73] Assignee: Matsushita Electric Industrial Co., Ltd., Osaka, Japan

[21] Appl. No.: 268,496

[22] Filed: Nov. 8, 1988

[30] Foreign Application Priority Data

Nov. 10, 1987 [JP] Japan .................................. 62-283509

[51] Int. Cl.[5] ............................................. B32B 31/12
[52] U.S. Cl. .................... 156/153; 156/304.5; 51/284 R; 51/284 E; 350/252; 350/412; 350/416; 350/417
[58] Field of Search ............................ 156/153, 304.5; 51/284 R, 284 E; 350/409, 412, 416, 417, 242, 245, 252

[56] References Cited

U.S. PATENT DOCUMENTS

| | | | |
|---|---|---|---|
| 2,553,227 | 5/1951 | Wesner | 156/304.5 |
| 3,551,021 | 12/1970 | Straat | 350/252 |
| 4,391,621 | 7/1983 | Siegmund | 51/284 R |

Primary Examiner—Caleb Weston
Attorney, Agent, or Firm—Wenderoth, Lind & Ponack

[57] ABSTRACT

A lens array for reading information employed in a copying machine, a facsimile machine, etc. and a manufacturing method thereof, wherein a pillar lens is formed by cutting a spherical lens parallel to the direction of an optical axis, and a number of the pillar lenses are arranged in two layers, upper and lower layers and then fixed with a pair of frame members, thus effecting mass production of a very accurate lens array at a low cost.

3 Claims, 3 Drawing Sheets

(a)  (b)

METHOD OF MANUFACTURING A LENS ARRAY FOR READING INFORMATION

BACKGROUND OF THE INVENTION

The present invention generally relates to a lens array for reading information employed in a copying machine, a facsimile machine, a printer or the like and also to a manufacturing method thereof.

Conventionally, as a lens array for reading information, there have been generally employed a lens array which is made by arranging a number of gradient index lenses (manufactured by Nippon Itagarasu Kabushiki Kaisha under the trademark SELFOC lens array, hereinafter referred to as the first prior art), or a lens array which is made by arranging a number of combinations of an upper pillar lens and a lower pillar lens as disclosed in Japanese Patent Laid-Open Publications No. 53-122426, No. 55-83071, and so on (hereinafter referred to as the second prior art).

However, the first prior art has problems such as a complicated manufacturing method and high cost.

On the other hand, in the second prior art, the pillar lens b is generally formed by pressing a transparent plastic material a as shown in FIG. 9 of Publication No. 55-83071. In this case, accuracy of a curvature of the lens and mass production are not ensured. Moreover, since it is difficult to press glass to form the pillar lens, light transmission is worse.

SUMMARY OF THE INVENTION

An object of the present invention is to provide a lens array for reading information with high accuracy and capable of mass production at a low cost.

In order to solve the above-described problems, the lens array for reading information of the present invention is produced in such a way that a number of pillar lenses formed by cutting a spherical body parallel to the direction of the optical axis are arranged in two layers, an upper and lower layer, and then fixed with a pair of frame members.

The element, namely the lens array or the pillar lens is formed by cutting the spherical body parallel to the direction of the optical axis, which is advantageous to obtain a more accurate lens and to carry out mass production. In other words, the technique for making a spherical body from glass or the like, which has already been established, is most favorable in order to obtain higher accuracy in a curved surface, i.e., a spherical surface, of the spherical body and to mass-produce it at a low cost. Also, the technique for producing a pillar lens by cutting the spherical body parallel to the direction of optical axis, which has also been established, is proper for mass production. The cutting is performed on surfaces other than two spherical surfaces which become lens surfaces, and the lens thus maintains very accurate spherical surfaces which have been imparted to the surface of the spherical body during manufacturing. Furthermore, it is easy to make a pillar lens from glass and it is possible to give the lens array for reading information good light transmission.

Thus, according to the present invention, a number of the pillar lenses having the characteristics described above are arranged in two layers upper and lower layers, and fixed with the frame members, it being thereby possible to project information such as an image of an original document on the image-reading portion of the image sensor as an erect identical real image.

BRIEF DESCRIPTION OF THE DRAWINGS

These and other objects and features of the present invention will become clear from the following description taken in conjunction with the accompanying drawings, in which.

Figure 2:
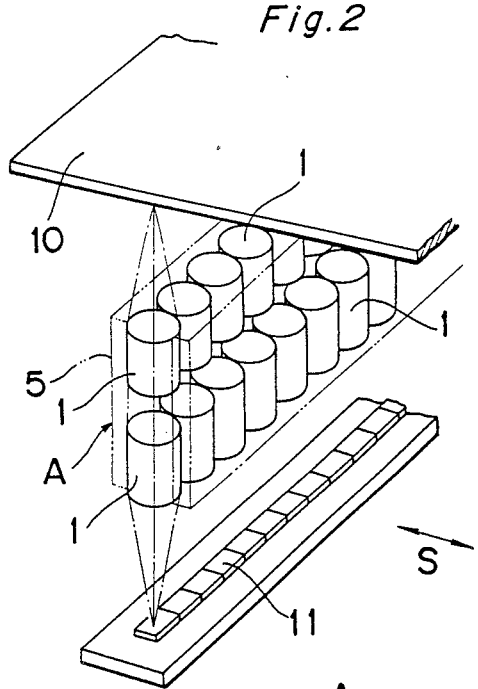
Figure 1:
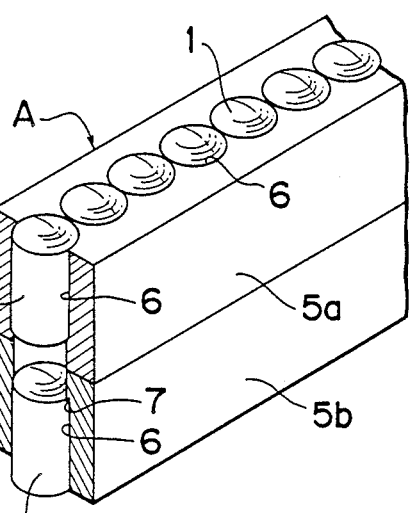
FIG. 1 is a perspective view showing a part of the lens array according to the first embodiment of the present invention.
Figure 3:
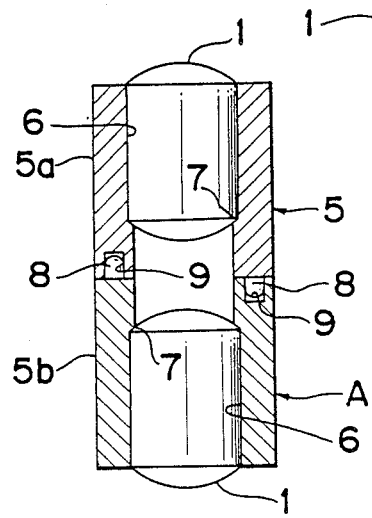
Figure 4:
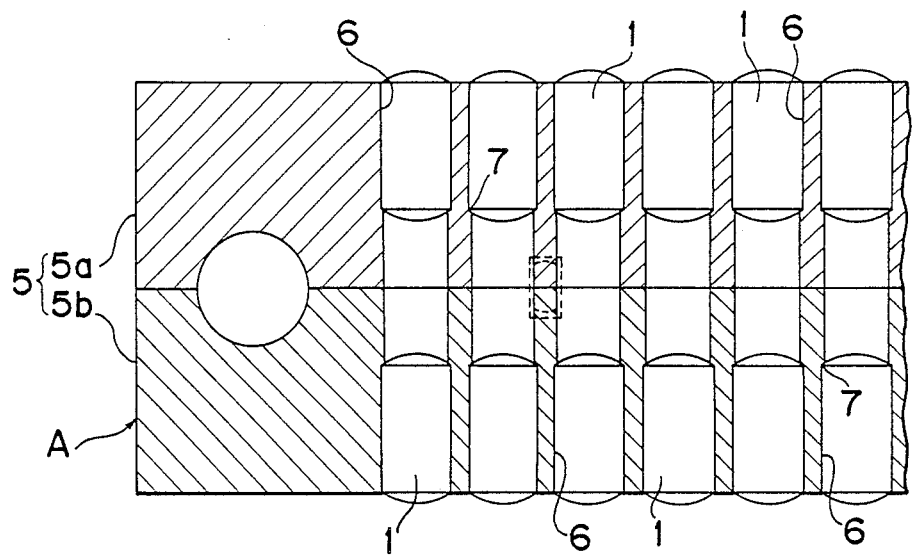
Figure 5:
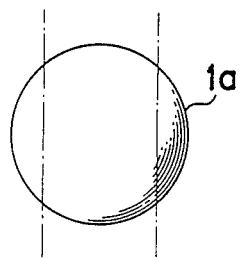
Figure 7:
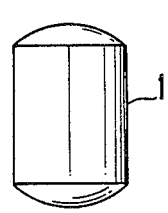
Figure 8:
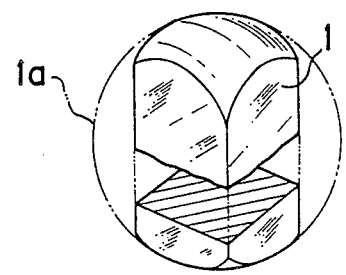
Figure 9:
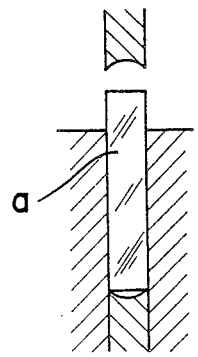
Figure 9:
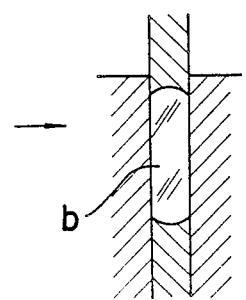

The lens array of FIG. 1 is a perspective view showing a practical use of the lens array of FIG. 1;

FIG. 3 is a transverse sectional view of FIG. 2;

FIG. 4 is longitudinal sectional view of FIG. 2;

FIG. 5 is a front view of the lens spherical body;

The lens array of FIG. 1 is a schematic diagram showing the manufacturing method of forming the pillar lens;

FIG. 7 is a front view of the pillar lens;

FIG. 8 is a perspective view of the pillar lens employed in the second embodiment of the present invention; and FIGS. 9(a) and 9(b) are cross sectional views showing the manufacturing method of forming a pillar lens according to the prior art.

DETAILED DESCRIPTION OF THE INVENTION

Before the description of the present invention proceeds, it is to be noted that like parts are designated by like reference numerals throughout the accompanying drawings.

It is to be noted here that the first embodiment of the present invention refers to the lens array, the element of which is a cylindrical lens 1, which is illustrated in FIGS. 1 through 7.

The cylindrical lens 1 is formed by cutting a spherical body 1a parallel to the direction of the optical axis so as to make the body of the lens cylindrical as shown in FIG. 5. An optical lens ball, whose material is a single type of glass or a synthetic synthetic resin such as CR-39, acrylic resin, polystyrene, etc., is usable as the spherical body 1a. The manufacturing method of this optical lens ball is composed of several manufacturing processes similar to those of a ball bearing, which include in order (a) cutting a glass block into small cubes, (b) putting the small cubes in a revolving cylindrical container and then revolving the container to grind off the edges of the small cubes, (c) rough finishing, (d) semi-finishing, (e) finishing, and (f) examination. When the diameter of the optical lens ball is 0.8 mm-1.8 mm, a minute error as along as $\pm 2\mu m$ in diameter and 1.5 microinch (AA) in surface finish is acceptable, and, in spite of mass production, high accuracy can be thereby maintained.

Figure 6:
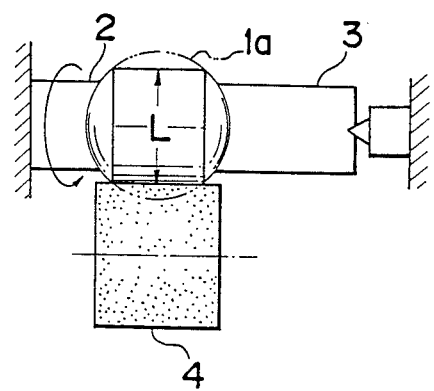

It is preferable to use the grinding method as shown in FIG. 6 for making the cylindrical lens 1 from the spherical body 1a. In this method, two parts of the spherical body 1a, which become lens surfaces, are supported between revolving bolts 2 and 3, and the spherical body 1a is cut parallel with the direction of the optical axis by means of a revolving grindstone 4. The method includes many steps, at each of which the body is ground by degrees so that the diameter L of the cylindrical portion may be gradually made smaller, little by little. Finally, it is polished, and thus the cylindrical lens 1 as shown in FIG. 7 takes form.

The cylindrical lenses 1 formed by the abovedescribed method are arranged in two layers, upper and lower layers as shown in FIGS. 1, 3 and 4, and fixed with a pair of frame members 5, whereby a lens array for reading information is constructed.

FIGS. 1, 3 and 4 show the cylindrical lenses 1 positioned in into a plurality of lens holder openings 6, which are close to each other in a line on the upper frame member 5a and the lower frame member 5b, respectively, and then the upper frame member 5a is placed upon the lower frame member 5b with the upper lenses and the lower lenses aligned. The upper frame member 5a and the lower frame member 5b are made of opaque plastic such as acrylic resin, PPS, etc. and are of the same form. There are provided protruding portions 7 in each of the lens holder openings 6 so as to position the direction of the optical axis of the cylindrical lens 1. The upper frame member 5a is paired with the lower frame member 5b in an accurate position by the engagement of the convex portions 8 and the concave portions 9, both of which are provided on the upper frame member 5a and the lower frame member 5b. Next, they are joined with ultrasonic bonding, adhesive, or the like.

When the refractive index of the cylindrical lens 1, radiuses of curvature of the upper and lower surfaces of the cylindrical lens, the length of the optical axis, and the interval between the upper cylindrical lens 1 and the lower cylindrical lens 1 are properly set upon consideration of the mutual relation, a lens array A for obtaining an erect identical real image is formed. The lens array A is employed, for example, for the purpose of forming an image of an original document 10 on an image sensor 11 (instead of an image sensor, it is possible to use a combination of a slit and a sensitive material) and image information is read by the image sensor 11 as shown in FIG. 2. The image sensor 11 reads image information over the whole surface of the document 10 by scanning the document 10 or the image sensor 11 itself in the direction S.

Although the present invention has been fully described by way of example with reference to the accompanying drawings, it is to be noted that various changes and modifications are apparent to those skilled in the art. For example, according to the second embodiment of the present invention as shown in FIG. 8, the lens array for reading information can be formed of a number of prismatic lenses 1, which are made by cutting the spherical body 1a parallel to the direction of the optical axis, arranged in two layers upper and lower layers, and fixed with the frame members 5. As for the frame member 5, it is possible to use a frame member which has lens holder openings 6 for fixing the prismatic lenses 1 in two layers, upper and lower layers, or to use a frame member which is divided into two parts, right and left, for sandwiching the prismatic lenses 1 securely. Moreover, it is possible to fix the prismatic lenses 1 to the frame member 5 with adhesive. Such changes and modifications are to be understood as included within the scope of the present invention as defined by the appended claims unless they depart therefrom.

What is claimed is:

1. A method of manufacturing a lens array for reading information, which comprises:
   forming a plurality of cylindrical lenses by forming a plurality of spheres of a single lens material and each having a spherical surface corresponding to the desired lens shape, supporting each of the spheres on revolving bolts of a revolving grinding machine at points on the surfaces of the spheres which are diametrically opposite each other, and operating the grinding machine to grind a cylindrical surface on each sphere which is concentric to the axis between the points on the surfaces of the sphere;
   providing a lens holder having lens receiving openings in side by side relation;
   inserting said cylindrical lenses into the lens receiving openings of the lens holder; and
   mounting one lens holder above a second lens holder with the lenses in the upper lens holder aligned with the lenses in the lower lens holder for forming the lens array.

2. A method as claimed in claim 1, wherein each of a pair of the lens holders has a convex portion and a concave portion for positioning and the lens holders are jointed by the engagement of the convex portions and the concave portions.

3. A method as claimed in claim 1, wherein the lens holders are made of acrylic resin.

* * * * *